United States Patent [19]

Colgate, Jr.

[11] Patent Number: 5,336,871
[45] Date of Patent: Aug. 9, 1994

[54] HOLOGRAPHIC ENHANCEMENT OF CARD SECURITY

[75] Inventor: Gilbert Colgate, Jr., New York, N.Y.

[73] Assignee: American Bank Note Holographics, Incorporated, New York, N.Y.

[21] Appl. No.: 831,267

[22] Filed: Feb. 7, 1992

[51] Int. Cl.$^5$ ............... G06K 19/10; G06K 19/12; G06K 19/16
[52] U.S. Cl. .................. 235/380; 235/487; 235/440
[58] Field of Search .............. 235/487, 380, 440, 457; 356/71; 359/2; 283/86

[56] References Cited

U.S. PATENT DOCUMENTS

| | | | |
|---|---|---|---|
| 3,691,350 | 9/1972 | Kuhns et al. | 235/468 |
| 3,807,859 | 4/1974 | Sugaya et al. | 356/71 |
| 4,013,894 | 3/1977 | Foote et al. | 235/380 |
| 4,034,211 | 7/1977 | Horst et al. | 356/71 |
| 4,094,462 | 6/1978 | Moschner | 235/449 |
| 4,119,361 | 10/1978 | Greenaway | 359/2 |
| 4,463,250 | 7/1984 | McNeight et al. | 235/383 |
| 4,656,473 | 4/1987 | Goldman et al. | 356/71 |
| 4,659,914 | 4/1987 | Kondo et al. | 235/380 |
| 4,684,795 | 8/1987 | Colgate, Jr. | 235/457 |
| 4,745,267 | 5/1988 | Davis et al. | 235/379 |
| 4,788,420 | 11/1988 | Chang et al. | 235/483 |
| 4,855,584 | 8/1989 | Tominyama et al. | 235/493 |

FOREIGN PATENT DOCUMENTS

| | | | |
|---|---|---|---|
| 366858 | 5/1990 | European Pat. Off. | 235/487 |
| 155282 | 6/1988 | Japan | 235/487 |

*Primary Examiner*—John Shepperd
*Attorney, Agent, or Firm*—Longacre & White

[57] ABSTRACT

An enhanced card security system wherein an optically readable portion is incorporated into the magnetic machine readable stripe on the card. The optically readable portion can include a holographic representation of a bar code or other conventionally known optical digit generator.

The optical stripe has a partial string of an identification number and, the magnetic stripe has the remaining string of the identification number. A check digit derived by combining the two partial strings and preforming a check digit calculation on the complete string is also recorded on the magnetic stripe. Transactions are approved if during reading of the card the calculated check digit from combining the two strings matches the recorded check digit.

8 Claims, 3 Drawing Sheets ns. 5,336,871

HOLOGRAPHIC ENHANCEMENT OF CARD SECURITY

BACKGROUND OF THE INVENTION

1. Field of the Invention

This invention relates to method of providing enhanced authenticity to credit cards, ID cards, drivers licenses and the like, and to such a card.

2. Description of the Prior Art

In the early days of credit cards, banks provided cards indiscriminately, and control of blank cards was lax. Consequently, there was an ample supply of blank credit cards with the banks' names on them which could be used by criminals. Additionally, the lack of security printing of these cards made it easy for criminals to manufacture their own counterfeit cards whenever a supply of genuine cards was not available, and this "business" enriched many.

As the losses to the banks escalated, the banks more and more took measures to tighten the issuance of cards to approved customers, and also to increase the security of the design and manufacturing of the card itself. A number of measures were considered, but it was the introduction of a piece of foil bearing a holographically generated diffraction grating upon the front of the card that virtually eliminated what was then the major source of cards for criminals—the counterfeited card. Unfortunately criminals are still left with at least three other major opportunities for fraud.

The first is the use of a stolen or lost card—which can be used until the holder reports it lost or stolen. The second was the use of a "good" account number re-encoded onto an otherwise outdated or lost, but previously valid card. The third is using a valid number (without the card) or a "white" card with magnetic stripe for use in automatic teller machines (ATM) or telephones where the card is not authenticated by a person, but only machine read. Actually, there is a fourth type of fraud about to reassert itself. The Master Card and Visa holograms have been used in the field for eight years. Soon there will be sufficient technology available for someone, somewhere to begin creating acceptable counterfeits. It is again time for the security printer to remain the proverbial one step ahead of the counterfeiter.

Technology can do little at present with respect to fraud of the first type. However, the present invention can effectively enhance security against fraud of the second, third and fourth types.

In a typical credit card transaction a sales clerk looks at the card and, if it appears valid, swipes the card in a magnetic reader, such as that disclosed by Chang et al. (U.S. Pat. No. 4,788,420) and incorporated herein by reference. The reader sends the account access identification number back to the authenticating source. If the source responds with approval, a transaction takes place. Eventually the legitimate card holder receives a bill which he/she pays or disavows. If properly disavowed, eventually the bank will have to absorb the loss since the magnetic reader had provided an authentic account access identification number which was accordingly approved. This is what happens in fraud of the first and second types.

The account access identification number written or encoded into the magnetic stripe is very much like the license plate number of a car. There is not a great deal of information on the license plate, nor is there a great deal of information in the magnetic stripe. The really valuable information, the payment history, the maiden name of the customer's mother, etc. is all stored down stream in the bank's information system. Only the credit available is normally reached by inquiry from the field.

Thus the situation is similar to the automobile's license plate - or registration; not too much information is stored in the field, just a method of getting to the information stored in the Department of Motor Vehicle files.

Access to only a small part of the bank's information on a customer (current validity of the card, available credit) is made available to the merchant through the electronic network which is used every time a credit card is swiped or magnetically read by the equipment currently available to read and report a transaction.

While the supply of generally acceptable credit cards for illicit purposes is imperfect and small, it is still relatively easy for the determined criminal to acquire a physically genuine but outdated credit card and alter the magnetic information and also re-emboss the expiration date and names on the front. While the ironing out of the original name and re-embossing is not perfect and, upon close inspection can be determined by those familiar with such fraud, these mundane attempts to defraud are generally successful. Then, when the card is swiped, a credit worthy account is identified and the swipe machine is given a green signal to validate or authenticate the transaction, In some cases, especially at an ATM the only thing the criminal needs is a blank card with a magnetic tape encoded with a valid magnetically readable account access identification number and the unsuspecting victim's personal identification number (PIN) number. There are also a number of places, telephone kiosks and supermarkets where PIN numbers are not required and clerk verification of the actual card is not done.

There has been a long and valiant attempt to make the magnetic encoding secure and resistant to alteration. Watermark TM tape by Thorne-EMI was one such. The development of high oersted tapes by 3M Company and others is another. Both provide some limited enhancement of security in their own ways. But neither has found acceptance in the industry because of the changes to existing procedures each might require.

The Thorne-EMI approach magnetically incorporates a sequential number into the tape while the tape is in the manufacturing process; this can then be read by the magnetic reader. The idea and process was thwarted by the difficulty of manufacturing the tape and by keeping sequential numbering accounted for; and it was generally deemed to be too expensive.

The 3M solution is a solution only to the extent that high coercivity tape requires more powerful encoding equipment than that used to encode 300 oersted tape (the industry standard). To the extent such equipment is harder to obtain, security is at least marginally enhanced. The industry may yet move to high coercivity tape. It would require all Service Bureaus and Banks with their own issuing departments to buy new encoding equipment at least to phase it in over time. This is a heavy investment of equipment by a group with no great incentive to do so and there is no indication such high coercivity encoding equipment would not be available to the criminal element. As stated this is, at best, a marginal move.

In all cases, whatever has been placed within the magnetic reading environment is obtainable to anyone with rudimentary equipment to read the magnetic encoding. Even if the numbers make no sense—being in code or encrypted—it is still easy to replicate the coded or encrypted number. What has been lacking in the past, and which this invention solves, is another—unreadable by conventional equipment—level of numbers which can be incorporated into the magnetic stripe in a cost effective way.

All other efforts including the algorithms of magnetic numbering are vulnerable no matter how complex and sophisticated because it is the entire magnetic number, original or forged, which is read by the magnetic reader which relays that number down the communication line to the bank for verification.

An approach to solving the problem already exists with the "batch" number which is printed on most credit cards by the card manufacturer. Most often these are four digit numbers found on all American Express Cards and now upon some Master Cards. If there is some reason to suspect a transaction is fraudulent, then the validity of the card can sometimes be tied into the actual card by telephoning the issuing bank to determine if the batch number is a) genuine and not stolen and b) if the magnetic information pertaining to a particular person on the card was matched to the batch number on the front of the card.

This is an imperfect and laborious way of determining fraud and is only done when the person offering the card appears to be out of character for the transaction—i.e., a teenager in dirty sneakers attempting to use a card to purchase a brand new automobile, or some such off-putting situation.

A further approach is developed by Tominyama et al. in U.S. Pat. No. 4,855,584 of Aug. 8, 1989. They developed a "double" read of the card in question by machine, rather than the above mentioned need to telephone in the data. However, in their approach one needs to hide the "certifying medium" by using a bar code which actually acts like a magnetic stripe. Not only is this improbable in practice but even if one discounted the need to have a "magnetic reader" read the bar code (printed as it is in magnetic ink, column 4, lines 30-39) and printed a bar code viewable only by an IR reader, the determined counterfeiter could decipher the underlying information, since it also is a magnetic reading medium.

All the criminal needs to do is copy the entire number. The problem is similar to attempting to create a visual security pattern or system which cannot be copied by a color xerox machine. As long as the human eye can see the security pattern so can the color copier. All sorts of attempts have been made to defeat the copier and at this writing all (short of the extremely cumbersome and impractical) have failed. The problem facing the authentication of the credit card is not quite so extreme and it does admit to a novel and very practical solution.

SUMMARY OF THE INVENTION

The solution of the present invention is based upon in effect dividing the number required for authentication between two sets of data, one set being encoded upon an conventional magnetic stripe, while the other is encoded on an optically readable piece of material. The optically readable material is for example a hologram of a bar coded number or numbers hot stamped onto a foil and fixed to the card. Alternatively and preferably, the optical material may be chopped and mixed into the magnetic stripe as taught in my earlier U.S. Pat. No. 4,684,795 (incorporated herein by reference).

According to the preferred embodiment of the present invention a check digit, of which there are a number of versions, commonly called Modulus (or MOD) 9, 10, 11 or 12 is used. All check digit schemes are based upon the manipulation of a base number multiplying, dividing, adding them together so that by the addition of a single number at the end of the base string of numbers, the correctness or authenticity of the base number is verified. Thus a serial number as in 12345 would have added to itself a check digit number which would be from 0 to 9 depending upon the modulus calculation, i.e. 123453. If there were a juxtaposition or transposing error in the number 123453, i.e., 132453 the check digit number would no longer be the numeral 3 and a flag or error would be noticed.

There is no question that the account number of a credit card holder can be provided with a check digit number, but since the criminal can read the magnetic number i.e., 123453 on a conventional card and replicate it upon magnetic tape, the check digit number serves no useful purpose as far as security in the field is concerned vis a vis the magnetic stripe.

The check digit is preferably not on the optically readable stripe or portion but rather as part of the magnetic stripe. The optical material has one or more of the numbers forming part of the identifying number. Thus, if a criminal presents a card using the present invention, but with only the magnetically coded information, it will be rejected because the check digit will not match. At the same time if a genuine card which does not use the present invention, and accordingly has only the magnetically coded information, is presented, it will be accepted as genuine. Neither the system nor the person operating it have to distinguish between a card which has an optically readable portion and one which does not; that is done automatically.

The invention works particularly well by combining the magnetic tape with an outside viewable hologram as taught in my earlier U.S. Pat. No. 4,684,795. Therefore, while the combining of the holograph and magnetic stripe is not required to allow the invention to work, the preferred or best mode for using this invention suggests that a combination holographic and magnetic stripe be used.

Thus, when the combined holographic magnetic stripe is used it is necessary for a clerk to only make one "swipe" of the card through an electronic reader which will read the magnetic stripe and also the number coded in the hologram.

Thus, the present invention uses both the relatively recent capability to machine read a hologram with the existing and older capability to machine read the magnetic stripe. Of course the machine readable equipment and features are different. The hologram can be read by a bar code or laser diode system and the magnetic stripe by a magnetic reader. Both readers convert the read material into an electric signal, however, and it is this electric signal which can be combined and assimilated and manipulated as one overall number. One aspect of the novelty of this invention is in the combining of the two different technologies—both available on the market—but never before integrated into a single security device. Looked at in this, the concept appears very simple: you simply "read" a holographically created image translating the visual image into either bars of black and white understandable to a modified bar code reader or other optical character reader which then translates the "number" into digital information which can be computer processed and simultaneously one reads magnetic information which is likewise computer processed. The "visual" information authenticates the magnetic information but does not appear in the magnetic information and therefore cannot be transferred to "white plastic" or to some one else's outdated lost/retrieved credit card. A further novelty of this invention is by combining the hologram and magnetic stripe into one site and reading the two "types" of information (magnetic and optical) virtually simultaneously with one swipe one dramatically increases the difficulty of simulating or counterfeiting the card. The reasons are not obvious but known to the trade. The magnetic flux of the stripe is calculated in oersteds—it is a fairly weak charge which is read by the machines and the reading head must be in virtual contact with the magnetic stripe in order to read the charge. If one prints anything on the stripe, the depth of the ink will move the stripe too far away for the standard equipment to read it. In other words, in attempting to fool the optical reader one assuredly defeats the magnetic read, and if one lets the magnetic read alone one cannot provide the optical reader with the information it needs.

The hologram may have two or more machine readable attributes. Either of the following methods will serve to make the invention work and there may be others which have not been developed or researched.

The first method is to create the embossed hologram with a square which reflects light at a specific angle. Thus a holographic diffraction grating is created which will, when hit with light, diffract light at a specific angle which can be measured by a receiver, and by that receiver be equated with a specific number. By creating a square diffraction grating, a commercial reader has been developed by HK Spring and Co. of Japan, which can differentiate up to a thousand different numbers.

The second method is to create a bar code by use of a diffraction grating (or by holographic creation) where the image of the bar code lines is either at the focal plane or in the background of the hologram. The most simple technology would be to have the bar code represented as visible lines on the focal plane. This could be a code 39 bar code or Interleaved 2 of 5.

Concomitantly with the reading of the holographic number permanently embossed into the holographic element of the credit card, the magnetic number is preferably read by conventional magnetic reader technology.

Electronic reading equipment which is currently available can, with one swipe read the holographic number in bar code form, which for the purposes of this invention need not be more than a single digit 0-9 (but which may be any amount of numbers) and also the magnetic number.

Currently, when a credit card is issued to a person by a bank, the bank, or a service company hired by the bank, takes a blank credit card and encodes the personal data of the bank's customer in two places. Operating off a magnetic computer tape, the encoding equipment (most often designed by the Data Card Corporation or FIMA) embosses the card and enters the name and account number of the customer into the magnetic stripe.

When the holographic imaging of the combined holographic and magnetic tape is manufactured, ten different H-1 images of the bar code 0-9 are created. These are randomly incorporated into the embossing plates so that in a universe of 100,000 finished cards there are approximately 10,000 of each number. In manufacturing it will be found prudent to have any given roll of tape (holographic/mag stripe) contain no more than one holographic bar code number. This designs out the problem of ensuring a given finished card has only one holographic bar code on it. This can be done by having "rows" of different numbers on the embossing plate.

This invention foresees the retro-fitting of the Data Card encoders so that the encoder reads the bar code on the card (the blank card) which it is about to emboss. Thus, the encoder will read for example the number "4" and then will receive the information from the computer tape which is mounted on the encoder/embosser that the account number for this particular card is "12345".

Instead of encoding magnetically 12345 or using a check digit for that account and encoding 123453, the equipment will combine the bar code read information with the magnetic information and read the number as 412345. It will then calculate and assign the appropriate check digit # which we will assume is the #8.

The encoder will emboss the name and the account number 12345 on the front of the card and will encode magnetically the numbers 123458 on the magnetic stripe.

When the card is subsequently issued and used in a transaction the swipe reader will first see the holographic number 4 in bar code on the stripe. Then the magnetic reading head will read the 123458. An intelligent chip will verify the 8 as the correct check digit for 412345. While this is accomplished not exactly instantaneously, it is done in sufficient real time that a green light at the end of the swipe reader will go on to authenticate the card as: a) having the holographic stripe; and, b) having a magnetic number; which, c) is correctly tied into the holographic number.

It is possible to consider using 2 bar code numbers, for example: a 43 so that a check digit would have to be chosen to verify the number 4312345, or even more numbers. The result is still only a single check digit number at the end of the account number, but for the criminal this is significant because what has to be communicated to the terminal which authorizes the transaction at the bank—the one which has all the information as to credit limits, etc., is the number 123458. That is now the account number —not what is embossed, that's only 12345.

But suppose a criminal were to present a card which contained a simple brown stripe magnetic number which, having read the genuine card (and finding the mag reader showing 123458) they then encoded 123458. The criminal now has all the magnetic information and, under the present circumstances, could get authorization. However, the swipe reader of the ATM will not see holographic #4 and will not accept the 123458 since the correct check digit number for 12345 is 3 and the reader would authorize only 123453. If the criminal has another card which has a holographic imprint, unless the hologram were bar code 4, (or 43 or how ever so many numbers the issuer chooses to use) the check digit 8 will be wrong and will trigger only a red flag and no access to the account or authorization.

The electronic circuitry for tying together the magnetic signal (which is turned into an electric pulse) and the bar code reader (which also turns its results into electric pulses) is within the known technology of electronic engineering.

Thus, the preferred method is to combine the hologram and magnetic stripe on one side of the card and retro-fit the card reader (which is primarily a magnetic reader) with a bar code scanner for the purpose of reading the holographic information.

The following is a description of the preferred embodiment of the invention and includes claims and drawings which form a part thereof.

DETAILED DESCRIPTION OF THE PREFERRED EMBODIMENT

Figure 1:
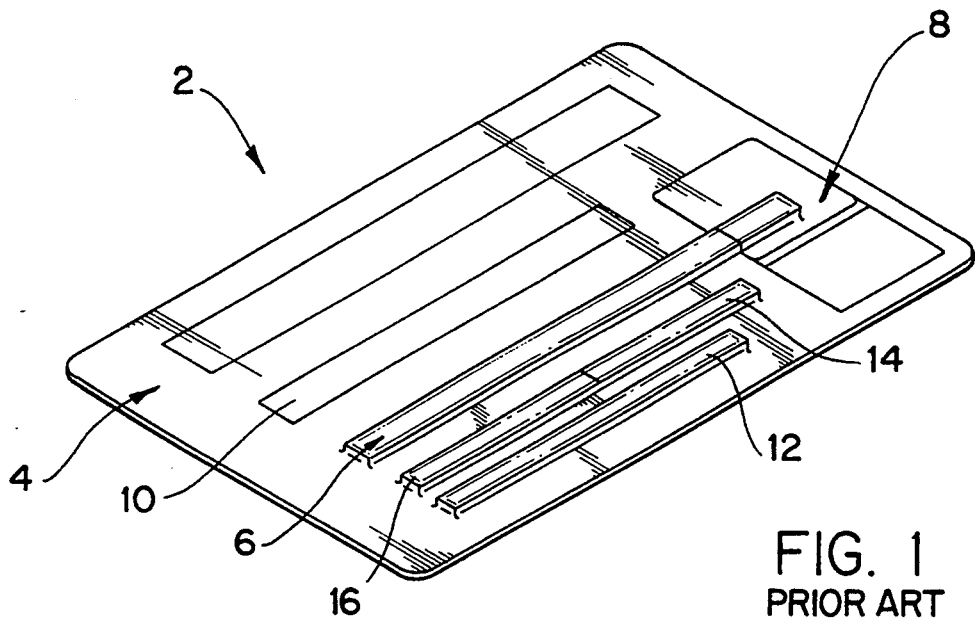
FIG. 1 shows a view of the front of a conventional credit card.
Figure 2:
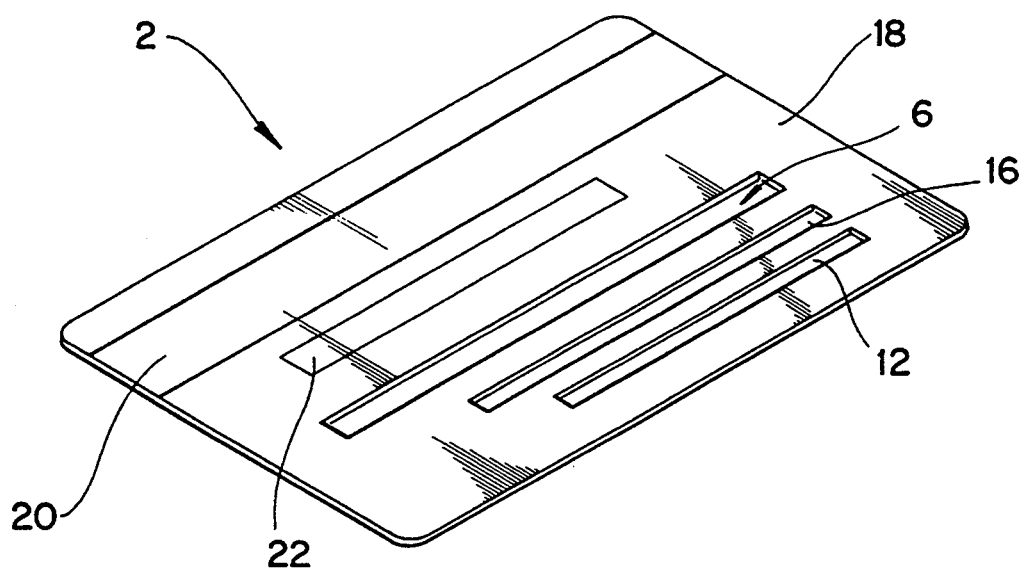
FIG. 2 shows a view of the back of a conventional credit card.

A previously known type of identification document is shown in FIGS. 1 and 2. A credit card 2 has a front side 4 including embossed alpha-numeric characters 6 for registering on standard merchant credit card forms, and a hologram 8. The hologram 8 provides a measure of security in so far as it is difficult to easily reproduce. Additionally, the front side 4 may have additional information printed on its surface which identifies the issuing bank, type of credit card, etc. and/or generally presents a graphical image. The embossed characters 6 generally include the bank account number 10, name of the individual to whom the card was issued 12, and date(s) for which the card is valid 14. The embossed characters 6 may or may not include other identifying information such as a batch number 16. FIG. 2 shows a back side 18 of the credit card 2 generally including a magnetic stripe 20 and an authorized signature panel 22. Like the face 4, additional information and/or graphics may be printed on the surface of the back 18.

In the past, the hologram 8 has been generally successful in discouraging all but the most dedicated criminal. The hologram 8 generally consisted of an image which is visually quite striking but contained no machine readable data, i.e. it relied upon visual inspection by a merchant to establish its validity.

Figure 3:
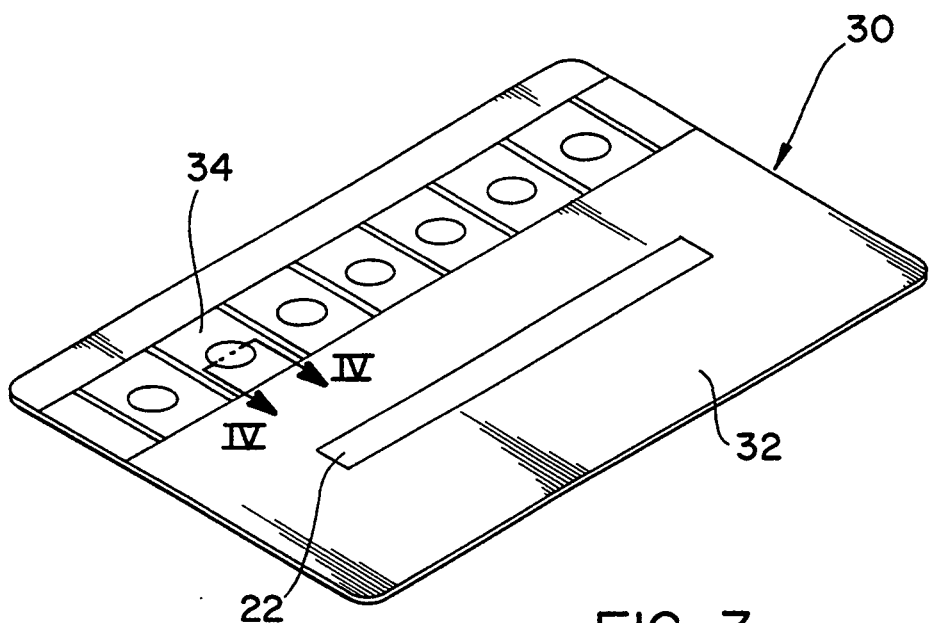
FIG. 3 shows a view of the back of a credit card according to the present invention with a stripe having machine readable magnetic and optical portions.
Figure 4:
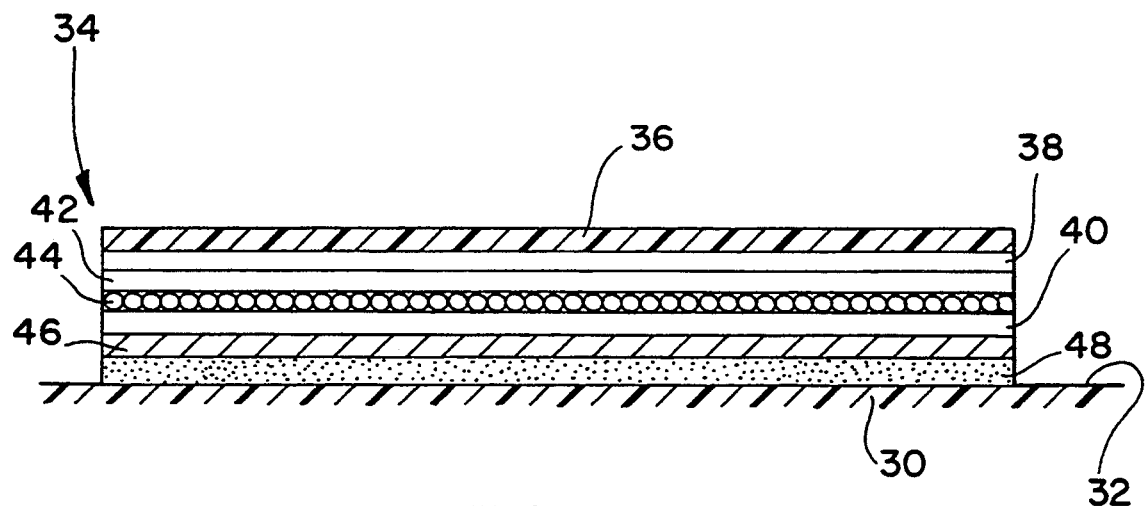
FIG. 4 shows a partial cross-section of the credit card of FIG. 3 along the line VI—VI.

A preferred embodiment of an identification document according to the instant invention is shown in FIGS. 3 and 4. A substrate 30, made for example from plastic or an equivalent material, has a face 32 including a holographic/magnetic stripe 34. The holographic/magnetic stripe 34 is a laminated composition formed as follows. A clear plastic carrier 36, for example a one-half to one mil clear polyester, is coated with a release coating of a commercially available clear wax slipping compound 38. The slipping compound releasably secures a hologram 40 to the carrier 36 and, upon application of heat, releases the carrier from the hologram 40. Interposed between the hologram 40 and the slipping compound 38 is one or more coats of clear scuff 42 and, optionally, a coating of glass beads 44. The coat(s) of scuff 42 are relatively hard and are conventionally used to protect magnetic tape after fixation to a substrate. The coat of glass beads 44, a composition of clear lacquer incorporating beads typically less than 5 $\mu$m in diameter, acts such that when hit by light of certain radiation, the resultant radiation can be read and measured as a further test of the validity of the document. The hologram 40 is treated, for example with methyl-ethyl ketone, to facilitate adhesion of ferrous oxide 46. A high-density slurry of the ferrous oxide 46 is applied to the hologram 40 by a gravure coater. The ferrous oxide 46 is generally combined with an adhesive 48 which fixes the particles of ferrous oxide 46 when dry, and upon later application of heat provides the "glue" by which the holographic/magnetic stripe 34 permanently adheres to the substrate 30. The holographic/magnetic stripe 34 is fixed to the card by a hot stamping process which 1) activates the adhesive 48, and 2) allows the carrier 36 to be released from the hologram 40 via the slipping compound 38. The carrier 36, having performed its function of providing a base upon which to build the holographic/magnetic stripe, may be removed and discarded.

The ferrous oxide 46 stores encoded magnetic data and the hologram 40 stores encoded optical data. The hologram 40 is configured in either of two known arrangements for relinquishing the optical information. The first arrangement uses a portion of the hologram, for instance a particularly located square, to reflect a light source at a specific angle which is detected by an optical data reader and correlated with a numerical value. A known example of this technology can differentiate up to one thousand different numbers. The second possible arrangement uses the diffraction grating in a hologram to generate a bar code detectable in the presence of a light source by an optical data reader. The bar code could use a code 39 format or an Interleaved 2 of 5 format, for example.

Figure 5:
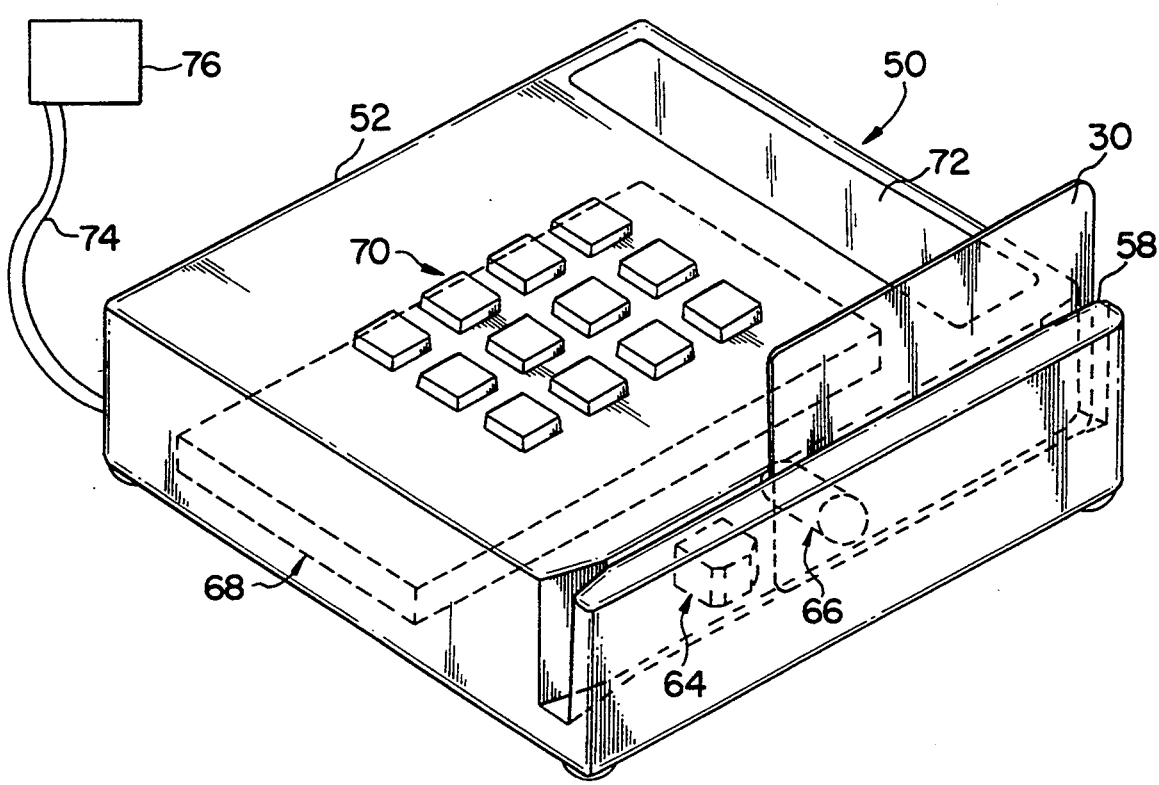
FIG. 5 shows a perspective view of a machine reading both magnetic and optical portions.

FIG. 5 shows a data reading terminal 50 which is particularly advantageous for point of sale credit verification applications. The terminal 50 includes a case 52 which defines an integral document slot 58 which extends along the right hand side of the cover 52. The cover 52 defines the sidewalls as well as the bottom wall of the slot 58. A magnetic read head 64 is mounted in an aperture in one of the sidewalls for detecting magnetic data encoded on a document's holographic/magnetic stripe 34 as the document is swiped past the magnetic read head 64. An optical data reader 66 is mounted in another aperture in one of the sidewalls for detecting optical data encoded on a document's holographic/magnetic stripe 34 as the document is swiped past the optical data reader 66. The electronic output of the magnetic read head 64 and the optical data reader 66 is sent to circuitry 68 for processing as described in greater detail with reference to FIG. 6. The terminal 50 also includes a keypad 70 for manual data input, a display 72 for presenting data, and a data link 74, for example a telephone line, for connecting the terminal to a remotely located data bank 76.

Figure 6:
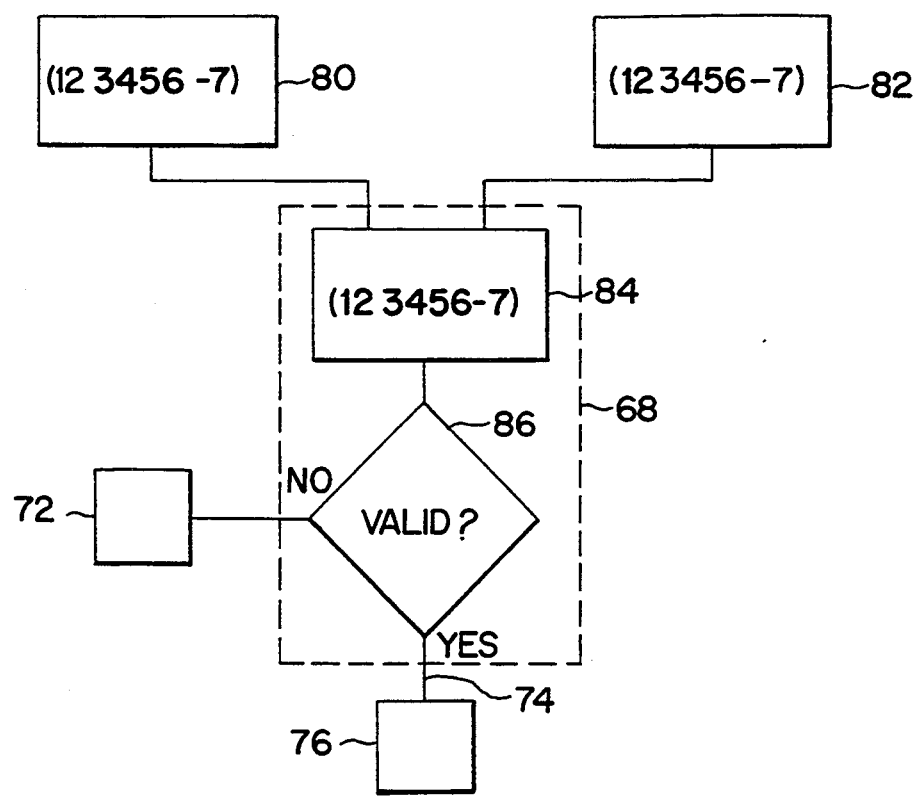
FIG. 6 shows a block diagram of the method of authenticating a credit card according to the present invention.

FIG. 6 is a flow diagram indicating the method by which the holographic/magnetic stripe 34 is read and the data contained thereon used to access the data bank 76. A document, for example an identification card, is swiped through the slot 58 in the terminal 50 such that the holographic/magnetic stripe 34 passes in front of both the magnetic read head 64 and the optical data reader 66. As shown at 80, the magnetic read head 64 detects the magnetic portion of the data present on the document. For example, this data may represent a portion of an account access identification number (12 3456-7) and a check digit (12 3456-7). As shown at 82, the optical data reader 66 concurrently detects the optical portion of the data present on the document. Continuing with the example, this data may represent another portion of the account access identification number (12 3456-7). As shown at 84, the circuitry 68 links the signals from the magnetic read head 64 and the optical data reader 66, resulting in a complete account access identification number with check digit (12 3456-7). As shown at 86, the account access identification number is mathematically manipulated and the result compared to the check digit to establish the validity of the document. If the account access identification number is valid, communication along the data link 74 is established between the terminal 50 and the data bank 76. If the account access identification number is invalid, an appropriate indication of such is given on the display 72.

A number of modifications are anticipated within the scope of the instant invention. Importantly, the magnetic and holographic data do not need to be embodied within one stripe. For example, identification cards as they appear currently (FIGS. 1 and 2) may be modified such that optically readable data is incorporated into the existing hologram area on the opposite side of the card from the magnetic stripe. The portions of data represented in magnetic and holographic form may be varied as long as both forms of data are necessary to validate a card. For example, a hologram may be used to enable the reading of a completely magnetically encoded account access identification number, or the division of the account access number between the magnetic and holographic portions may be varied.

The preferred embodiments described and shown are illustrative but not limitative and can easily be modified and varied by those skilled in the art without departing from the spirit and scope of the present invention which is considered to be defined in the appended claims.

I claim:

1. A method of enhancing security of an identification card comprising the steps of:
   coding onto a magnetic stripe a partial string of identifying digits;
   coding onto an optically readable portion at least one further identifying digit;
   appending said at least one further identifying digit to the partial string of identifying digits to fully identify the card; and
   coding onto said magnetic stripe a check digit determined from the appendage of both the partial string of digits on said magnetic stripe and the at least one further identifying digit on said optically readable portion.

2. The method according to claim 1, further comprising the step of:
   installing said magnetic stripe and said optically readable portion on an embossed plastic document.

3. The method according to claim 1, further comprising the step of:
   superimposing said optically readable portion with respect to said magnetic strip.

4. An identification document comprising:
   a carrier;
   a magnetic stripe on said carrier, said magnetic stripe including a first partial string of identifying data;
   an optically readable portion on said carrier, said portion including a second partial string of identifying data; and
   check data determined by appending said first and second partial strings of identifying data, said magnetic stripe including said check data.

5. The identification document according to claim 4, wherein said carrier is an embossed, plastic card.

6. The identification document according to claim 4, wherein said optically readable portion is a hologram.

7. The identification document according to claim 4, wherein said optically readable portion is a hologram of a bar code encoding at least one numerical digit.

8. The identification document according to claim 4, wherein said optically readable portion is superimposed with respect to said magnetic stripe.

* * * * *